United States Patent [19]

Emori

[11] Patent Number: 5,634,527
[45] Date of Patent: Jun. 3, 1997

[54] SPEED RESPONSIVE POWER STEERING

[75] Inventor: Yasuyoshi Emori, Saitama-ken, Japan

[73] Assignee: Jidosha Kiki Co., Ltd., Tokyo, Japan

[21] Appl. No.: 234,574

[22] Filed: Apr. 28, 1994

[30] Foreign Application Priority Data

May 21, 1993 [JP] Japan ..................... 5-143065

[51] Int. Cl.$^6$ .................................................. B62D 5/06
[52] U.S. Cl. .................... 180/423; 180/417; 180/441; 180/442
[58] Field of Search .................. 60/430; 91/370; 417/3, 286; 180/417, 421, 422, 423, 439, 441, 442

[56] References Cited

U.S. PATENT DOCUMENTS

| 3,986,472 | 10/1976 | Virtue | 417/286 |
|---|---|---|---|
| 4,116,577 | 9/1978 | Lauck | 417/286 |
| 4,570,736 | 2/1986 | Waldorf | 180/143 |
| 4,632,204 | 12/1986 | Honaga et al. | 180/142 |
| 4,858,713 | 8/1989 | Kawakami | 180/143 |
| 5,127,311 | 7/1992 | Bacardit | 91/370 |
| 5,168,949 | 12/1992 | Emori et al. | 180/132 |
| 5,320,191 | 6/1994 | Sudo et al. | 180/442 |
| 5,416,701 | 5/1995 | Kawabata | 417/286 |
| 5,515,938 | 5/1996 | Haga et al. | 180/442 |

FOREIGN PATENT DOCUMENTS

| 61-163062 | 7/1986 | Japan . | |
|---|---|---|---|
| 2-306878 | 12/1990 | Japan . | |
| 404027671 | 1/1992 | Japan | 180/143 |

Primary Examiner—Anne Marie Boehler
Attorney, Agent, or Firm—Flynn, Thiel, Boutell & Tanis, P.C.

[57] ABSTRACT

A main servo valve 4 is switched in response to a relative angular displacement between an input and an output shaft for supplying an operating oil discharged from a pump to or displacing such operating oil from a power cylinder 6. An auxiliary servo valve 10 is disposed between the input and the output shaft and is connected in parallel relationship with the main servo valve 4 so as to be operated jointly therewith. A vehicle speed responsive valve 16 which opens or closes a flow path in accordance with the vehicle speed is disposed upstream of the auxiliary servo valve 10. The pump comprises a pair of pumps 2, 12 of smaller size. At low speeds, the speed responsive valve 16 is closed, and the oil discharged from the pair of pumps 2, 12 are merged to be introduced into the main servo valve 4. As the vehicle speed increases, the speed responsive valve 16 is gradually opened, and at a vehicle speed above a given value, one of the pumps, 12, ceases to operate.

12 Claims, 3 Drawing Sheets

SPEED RESPONSIVE POWER STEERING

BACKGROUND OF THE INVENTION AND STATEMENT OF RELATED ART

The invention relates to a speed responsive power steering for variably controlling the magnitude of a steering power in accordance with a vehicle speed.

A power steering apparatus generally comprises an input shaft which is turned by operating a steering wheel, an output shaft disposed in coaxial relationship with the input shaft and connected thereto through a torsion bar, and a rotary servo valve including an inner valve member integrally rotating with one of the input and the output shaft and an outer valve member integrally rotating with the other shaft. A relative angular displacement between the input and the output shaft switches the servo valve to introduce an operating oil which is discharged from a pump into one of chambers in a power cylinder while returning the operating oil from the other chamber to a tank, thus operating the power cylinder to derive an assisting force.

In the power steering apparatus of the kind described, a greater assisting force is developed to achieve a light steering operation when running at low speeds or when the steering wheel is fixed, while a stable running is ensured by reducing the magnitude of the assisting force by reducing a flow rate supplied to the power cylinder through the servo valve when running at high speeds. FIG. 5 illustrates a circuit diagram of an example of a conventional power steering apparatus where an operating oil discharged from a pump 2 is supplied to or displaced from a power cylinder 6 through a servo valve 4, with a speed responsive valve 16 disposed in parallel relationship with the servo valve 4 so that when the steering wheel is fixed or when the discharge flow from the pump 2 is reduced as during a parking, the speed responsive valve 16 is closed to allow the entire discharge flow from the pump 2 to be supplied to the servo valve 4 to develop a greater asisting force during a steering operation while when running at high speeds, the speed responsive valve 16 is opened to return a part of the discharge flow from the pump to a tank 8, thus reducing the flow rate to the power cylinder 6 which is fed through the servo valve 4 to derive an assisting force of a reduced magnitude.

In the power steering of the prior art as mentioned above, when a steering operation takes place during the time the vehicle is running at a high speed, the servo valve 4 is throttled to cause an increase in its upstream pressure while the flow which is returned to the tank 8 through the opened responsive valve 16 increases to reduce the flow rate which is fed to the power cylinder 6, and accordingly, there is a difficulty in achieving a smooth increase in the oil pressure (see a curve a shown in phantom line in FIG. 6).

To accommodate for this, an arrangement is proposed (Japanese Laid-Open Patent Application No. 306,878/1990 corresponding to U.S. Pat. No. 4,570,736 or WO A1 9014261) in which in addition to a conventional servo valve, which will be hereafter referred to as main servo valve, which supplies or displaces an operating oil to or from a power cylinder, an auxiliary servo valve is disposed in parallel relationship with the main servo valve and is operated together with the main servo valve in response to a relative angular displacement between the input and the output shaft, with a speed responsive valve disposed either upstream or downstream of the auxiliary servo valve.

With this speed responsive power steering apparatus, as the main servo valve is throttled in response to a steering operation which takes place when the vehicle is running at a high speed, the auxiliary servo valve which is operated together with the servo valve is also throttled. This avoids an increase in the return flow which passes through the auxiliary servo valve, and in this manner, the flow rate which is supplied to the power cylinder through the main servo valve is assured, thereby obtaining a desirable response as indicated by a solid-line curve b shown in FIG. 6. However, in such arrangement, because there prevails a high pressure upstream of the main servo valve and the speed responsive valve during a steering operation, the entire discharge flow from the pump represents a dissipation of the engine horsepower, thus presenting a problem of a high power loss. A graph c shown in broken lines in FIG. 6 is included for purpose of comparison, and illustrates the response of a normal power steering which is not provided with the speed responsive valve.

OBJECT AND SUMMARY OF THE INVENTION

Accordingly, it is an object of the invention to provide a speed responsive power steering apparatus of power saving type.

Such object is accomplished in a speed responsive power steering apparatus including a pump which is driven by a rotation of an engine, a main servo valve to which an operating oil discharged from the pump is fed, a power cylinder to which or from which the operating oil is supplied or displaced in response to a switching operation of the main servo valve, an auxiliary servo valve connected in parallel relationship with the main servo valve, and a throttle valve disposed in a flow path associated with the auxiliary servo valve and which is gradually opened as the vehicle speed increases. In accordance with the invention, a second pump is provided separately from the above pump, and an arrangement is made so that an operating oil discharged from the second pump can be supplied to the main and the auxiliary servo valves, so that when the vehicle is running at a higher speed than a given value, the supply of the operating oil from the second pump can be interrupted.

DETAILED DESCRIPTION OF PREFERRED EMBODIMENTS

Figure 1:
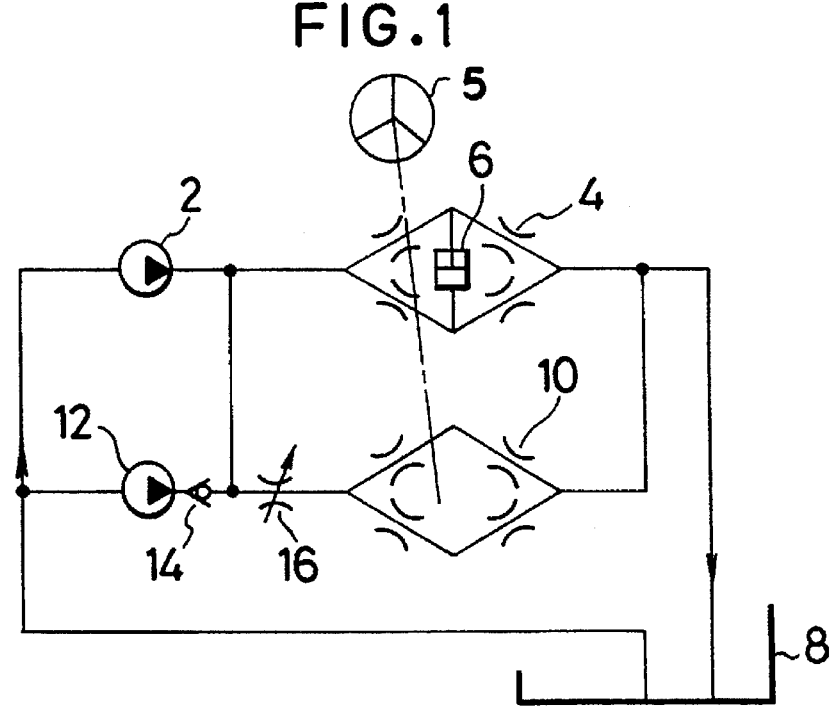
FIG. 1 is a circuit diagram of a speed responsive power steering apparatus according to one embodiment of the invention.

Referring to the drawings, several embodiments of the invention will now be described. FIG. 1 is a circuit diagram of a speed responsive power steering apparatus according to an embodiment of the invention. A first pump 2 is driven by an engine and a main servo valve 4 which is used to control the supply of an operating oil discharged from the first pump 2 to or displacement thereof from a power cylinder 6 is switched in response to a relative angular displacement between an input shaft which is turned in response to an operation of a steering wheel 5 and an output shaft connected to steerable road wheels. When the main servo valve 4 is switched by an operation of the steering wheel, a high pressure oil is introduced into one of the chambers of the power cylinder 6 while the operating oil from the other chamber is returned to a tank 8, thus operating the power cylinder 6 to develop a steering assisting force. In this arrangement, the first pump 2 used is of a smaller size than normally used in a conventional power steering apparatus.

An auxiliary servo valve 10 is also disposed to extend between the input and the output shaft in the same manner as the main servo valve 4 and is operated together with the main servo valve 4, and is connected in parallel relationship with the main servo valve 4. In this embodiment, a second pump 12 of a smaller size is provided, and is connected through a check valve 14 to the main servo valve 2 and the auxiliary servo valve 10, and can supply an operating oil to either of these servo valves 2, 10. The second pump 12 is designed so that when the vehicle is running at a higher speed than a given value, it ceases to operate or idles, thus interrupting the supply of the operating oil. The second pump 12 may comprise a pump which is driven by the engine and which can stop its operation by means of an electromagnetic clutch, a motor pump or a tandem cartridge pump or the like.

A speed responsive valve (or throttle valve) 16 which is opened or closed in accordance with the vehicle speed is disposed upstream of the auxiliary servo valve 10, and is completely closed when the vehicle is running at low speeds as when the steering wheel is fixed or during a parking so that the flow path for the operating oil discharged from the pumps 2, 12 is prevented from flowing to the auxiliary servo valve 10 while allowing the combined flow to be introduced into the main servo valve 4. However, the valve 16 is gradually opened as the vehicle speed increases, so that the proportion of the discharge flow from the both pumps 2, 12 which is introduced to the main servo valve 4 is gradually reduced, as by returning part of the discharge flow to the tank 8 through the auxiliary valve 10.

With the speed responsive power steering apparatus of the embodiment, when the vehicle is running at a low speed as when the steering wheel is fixed or during a parking, both the first and the second pump 2, 12 are driven to close the speed responsive valve 16 completely. In this instance, the operating oil discharged from the both pumps 2, 12 are combined to be fed to the main servo valve 4, thus allowing the entire flow to act upon the power cylinder 6 to achieve an assisting force of a greater magnitude during a steering operation.

As the vehicle speed increases, the valve 16 is gradually opened, whereby the pressure oil discharged from the pumps 2, 12 is partly allowed to flow to the flow path of the auxiliary servo valve 10. Thus, the proportion of the oil flow which is supplied to the power cylinder 6 through the main servo valve 4 is reduced, thus reducing the magnitude of the assisting force supplied through the main servo valve 4. As the vehicle speed further increases and exceeds a given value, the valve 16 becomes substantially fully open, whereby the second pump 12 ceases to operate or idles, thus interrupting the supply of the operating oil to the both servo valves 4, 10. In this instance, the operating oil discharged from the first pump 2 is divided between the main and the auxiliary servo valve 4, 10, so that the flow rate which is introduced into the power cylinder 6 through the main servo valve 4 is reduced, By causing the second pump 12 to cease to operate or to idle when the vehicle is running at a higher speed than a given value and the first pump 2 is of a smaller size than used in a conventional power steering apparatus, a fuel cost can be reduced in the higher speed range where the engine horsepower is required. Where the second pump 12 comprises a motor pump, a saving in the power is achieved by ceasing its operation, and it can be advantageously mounted at any desired location within an engine compartment.

Figure 2:
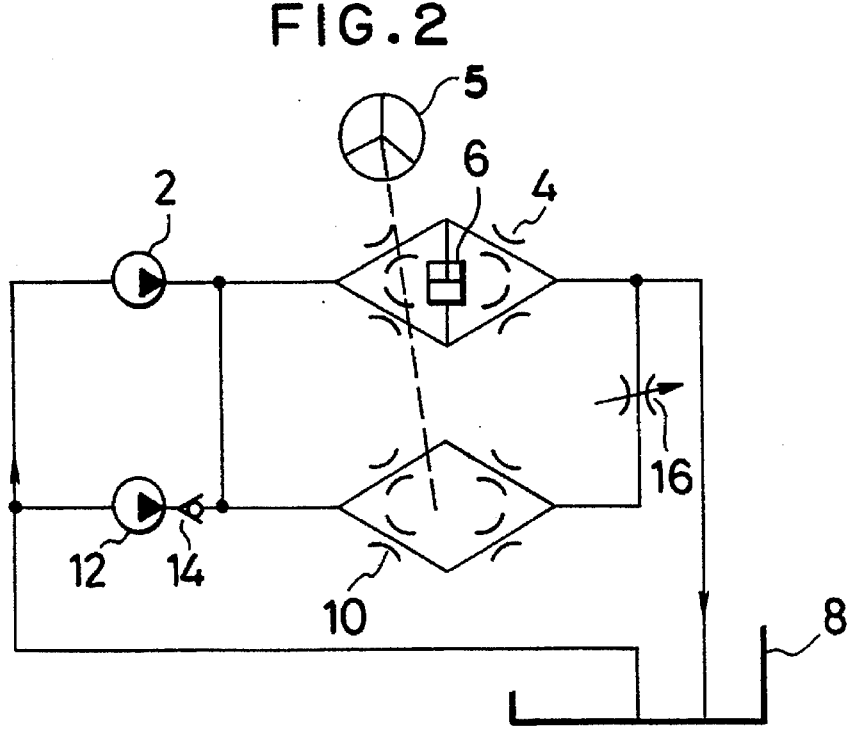
FIG. 2 is a curcuit diagram of a speed responsive power steering apparatus according to a second embodiment.

FIG. 2 shows a second embodiment of the invention where corresponding parts are designated by like numerals as before, and will not be described. In this embodiment, the speed responsive valve 16 is disposed downstream of the auxiliary servo valve 10, thus closing the valve 16 to prevent the operating oil from flowing to the flow path associated with the auxiliary servo valve 10 when running at a low speed while allowing the entire operating oil discharged from the first and the second pump 2, 12 to be combined to be introduced into the main servo valve 4. Again, as the vehicle speed increases, the valve 16 is gradually opened, and at a higher speed above a given value, the second pump 12 ceases to operate or idles, thus dividing the operating oil from the first pump 2 between the main servo valve 4 and the auxiliary servo valve 10, thus achieving the similar functioning as achieved with the first mentioned embodiment.

Figure 3:
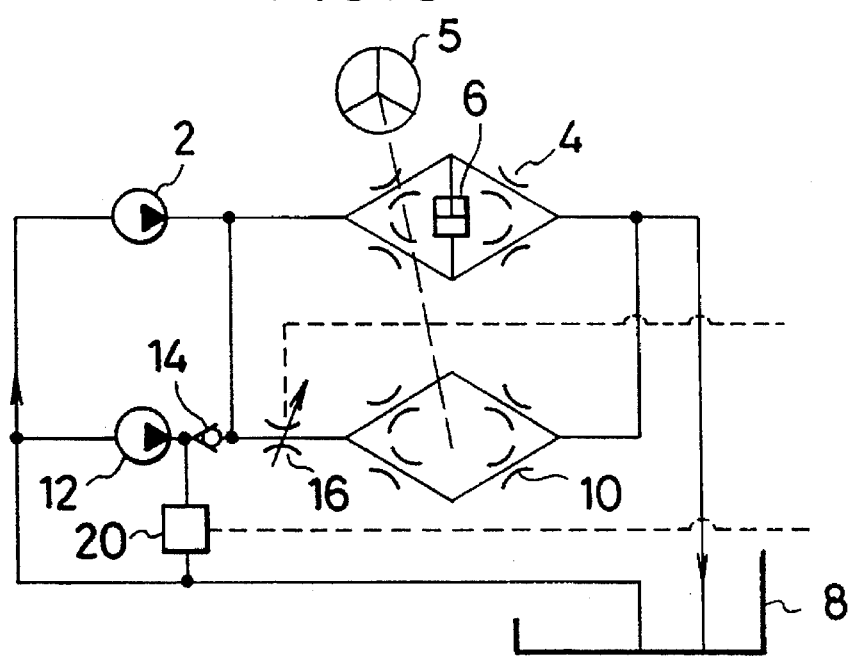
FIG. 3 is a circuit diagram of a speed responsive power steering apparatus according to a third embodiment.
Figure 4:
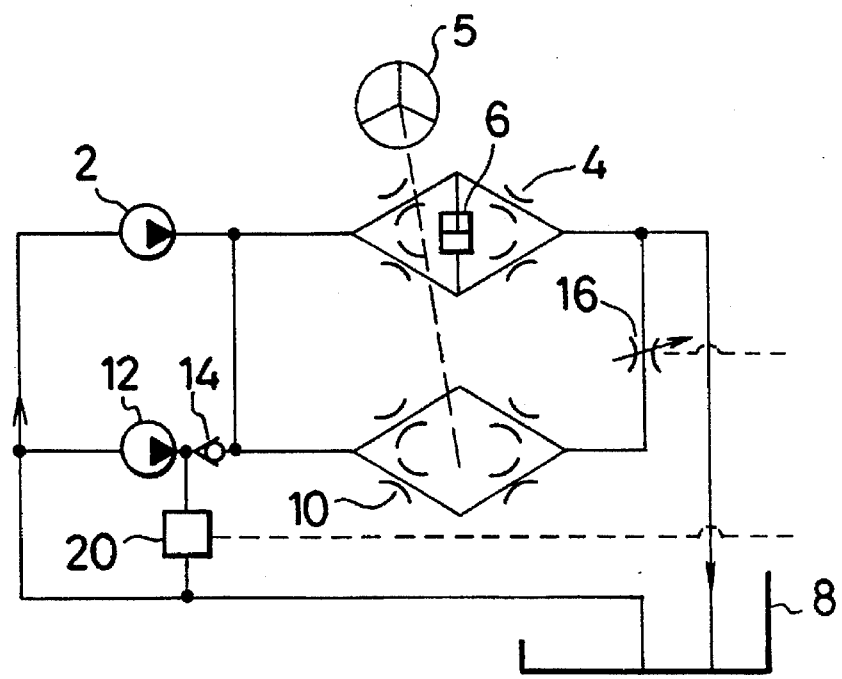
FIG. 4 is a circuit diagram of a speed responsive power steering apparatus according to a fourth embodiment.
Figure 5:
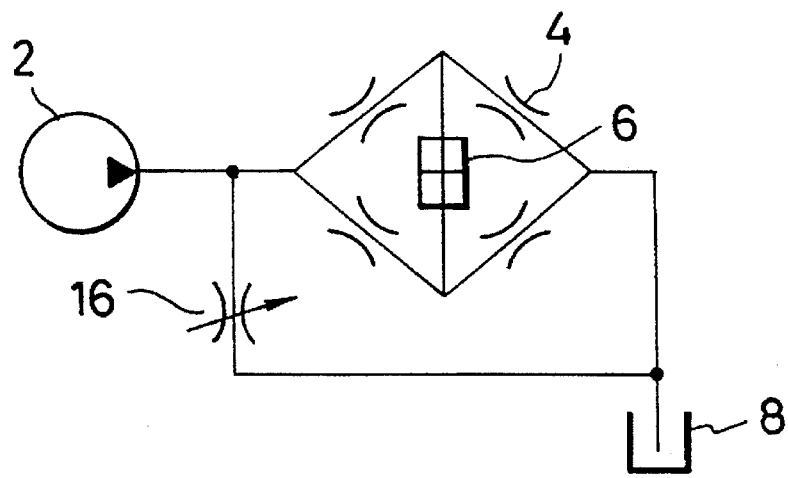
FIG. 5 is a circuit diagram of a conventional speed responsive power steering apparatus.
Figure 6:
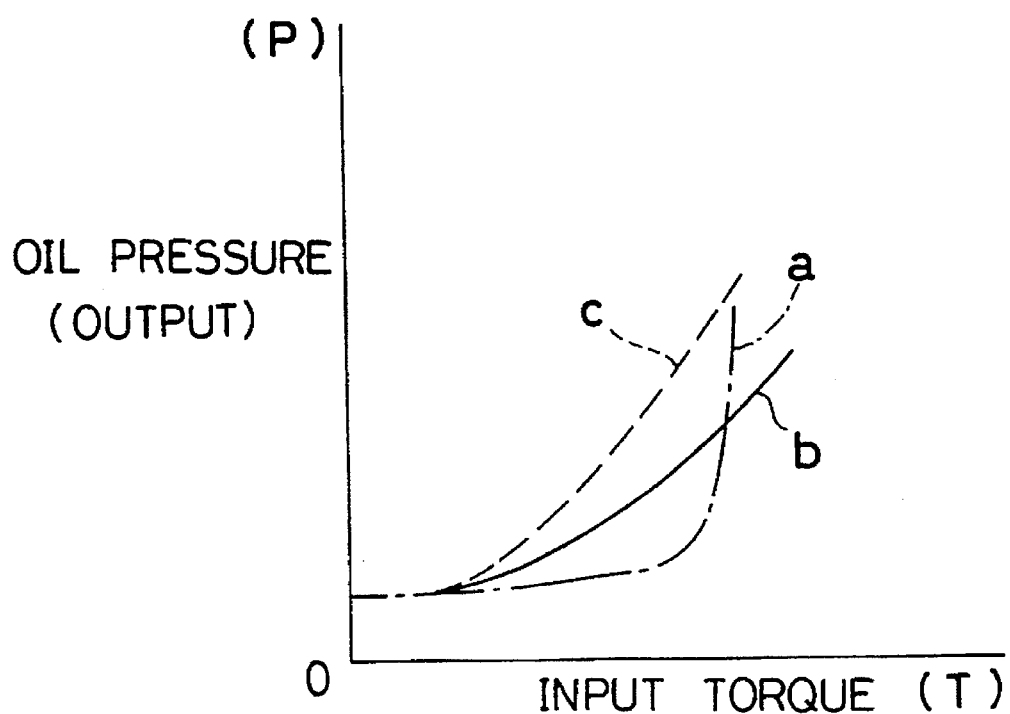
FIG. 6 graphically illustrates the responses of the speed responsive power steering apparatus according to the embodiments as compared against the response of a conventional speed responsive power steering apparatus.

FIGS. 3 and 4 illustrate other embodiments, and where the pump is of a tandem cartridge type, an unload valve 20 may be provided to unload a second pump cartridge 12 when running at a higher speed than a given value, to achieve the similar functioning as achieved with other embodiments.

While the invention has been described above in connection with several embodiments thereof, it should be understood that a number of changes, modifications and substitutions therein are possible without departing from the spirit and scope of the invention.

What is claimed is:

1. A speed responsive power steering apparatus for a vehicle, the speed responsive steering apparatus including: a steering mechanism; a pump assembly for supplying an operating oil; a power cylinder for receiving the operating oil; a main servo valve, the main servo valve being connected to and actuatable by the steering mechanism, connected to the pump assembly for receiving the operating oil and connected to the power cylinder for selectively supplying the operating oil to the power cylinder in response to the actuation of the steering mechanism; an auxiliary servo valve connected in parallel across the main servo valve and connected to the steering mechanism so as to be displaced with the main servo valve so as to regulate the pressure of the operating oil forced through the main servo valve when the main servo valve is actuated; and a throttle valve series connected with the auxiliary servo valve in the parallel connection across the main servo valve, the throttle valve being configured to block oil flow through the auxiliary servo valve when the vehicle is operated below a first selected speed and to allow oil to flow through the auxiliary servo valve when the vehicle is operated above the first selected speed, the improvement wherein:

the pump assembly comprises a first pump configured to continually supply operating oil to the servo valves and a second pump configured to supply operating oil to the servo valves in parallel with the first pump wherein, the second pump is configured to cease supplying operating oil when the vehicle is operated above a second selected speed.

2. The speed responsive power steering apparatus of claim 1, wherein the first selected speed at which the throttle valve opens is less than the second selected speed at which said second pump ceases supplying pressurized oil.

3. The speed responsive power steering apparatus of claim 1, wherein the throttle valve is configured so as to gradually move from a fully closed state when the vehicle is operated below the first selected speed and to gradually open as the speed of the vehicle increases above the first selected speed.

4. The speed responsive power steering apparatus of claim 1, wherein the throttle valve is disposed upstream of the auxiliary servo valve.

5. The speed responsive power steering apparatus of claim 1, wherein the throttle valve is disposed downstream of the auxiliary servo valve.

6. The speed responsive power steering apparatus of claim 1, further including a check valve connected to the second pump of the pump assembly to prevent operating oil from the first pump of the pump assembly or from the servo valves from being returned to the second pump of the pump assembly.

7. A speed responsive power steering apparatus for a vehicle, the speed responsive steering apparatus including: a steering mechanism; a first pump for continually supplying an operating oil; a power cylinder for receiving the operating oil; a main servo valve, the main servo valve being connected to and actuatable by the steering mechanism, connected to the first pump for receiving the operating oil and connected to the power cylinder for selectively supplying the operating oil to the power cylinder in response to the actuation of the steering mechanism; an auxiliary servo valve connected in parallel across the main servo valve and connected to the steering mechanism so as to be displaced with the main servo valve so as to regulate the pressure of the operating oil forced through the main servo valve when the main servo valve is actuated; and a throttle valve series connected with the auxiliary servo valve in the parallel connection across the main servo valve, the throttle valve being configured to block oil flow through the auxiliary servo valve when the vehicle is operated below a first selected speed and to allow oil to flow through the auxiliary servo valve when the vehicle is operated above the first selected speed, the improvement wherein:

a second pump is provided in parallel with the first pump to supply operating oil directly to the main servo valve and to the auxiliary servo valve, wherein the second pump is a speed responsive pump configured to cease supplying oil to the servo valves when the vehicle is operated above a second selected speed.

8. The speed responsive power steering apparatus of claim 7, wherein the first selected speed at which the throttle valve opens is less than the second selected speed at which the second pump ceases supplying pressurized oil.

9. The speed responsive power steering apparatus of claim 7, wherein the throttle valve is configured so as to gradually move from a fully closed state when the vehicle is operated below the first selected speed and to gradually open as the speed of the vehicle increases above the first selected speed.

10. The speed responsive power steering apparatus of claim 7, wherein the throttle valve is disposed upstream of the auxiliary servo valve.

11. The speed responsive power steering apparatus of claim 7, wherein the throttle valve is disposed downstream of the auxiliary servo valve.

12. The speed responsive power steering apparatus of claim 7, further including a check valve connected to the second pump to prevent operating oil from the first pump or from the servo valves from being returned to the second pump.

* * * * *